United States Patent
Bodziony et al.

(10) Patent No.: US 10,629,242 B2
(45) Date of Patent: Apr. 21, 2020

(54) RECORDING USER ACTIVITY ON A COMPUTER

(71) Applicant: INTERNATIONAL BUSINESS MACHINES CORPORATION, Armonk, NY (US)

(72) Inventors: Michal Bodziony, Tegoborze (PL); Artur M. Gruszecki, Cracow (PL); Tomasz Kazalski, Balice (PL); Rafal Korczyk, Bielsko-Biala (PL); Tomasz Sekman, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/833,169

(22) Filed: Dec. 6, 2017

(65) Prior Publication Data
US 2019/0172499 A1 Jun. 6, 2019

(51) Int. Cl.
| | |
|---|---|
| H04N 5/93 | (2006.01) |
| G11B 27/30 | (2006.01) |
| G11B 27/36 | (2006.01) |
| G06F 8/41 | (2018.01) |
| G06F 16/70 | (2019.01) |
| G06F 16/95 | (2019.01) |
| G06F 16/74 | (2019.01) |
| G06F 16/957 | (2019.01) |

(Continued)

(52) U.S. Cl.
CPC .......... *G11B 27/3036* (2013.01); *G06F 8/427* (2013.01); *G06F 16/70* (2019.01); *G06F 16/74* (2019.01); *G06F 16/95* (2019.01); *G06F 16/9577* (2019.01); *G11B 27/36* (2013.01); *G06F 17/2247* (2013.01)

(58) Field of Classification Search
USPC ................ 386/282, 278, 280, 286, 326, 353
See application file for complete search history.

(56) References Cited

U.S. PATENT DOCUMENTS

| | | | |
|---|---|---|---|
| 8,332,414 B2 | 12/2012 | Nguyen et al. | |
| 8,984,585 B2 * | 3/2015 | Martini | ..................... H04N 9/79 726/1 |
| 9,652,534 B1 | 5/2017 | Narayanan | |

(Continued)

FOREIGN PATENT DOCUMENTS

WO   2017070656 A1   4/2017

OTHER PUBLICATIONS

Chang, Shih-Fu et al., "A Fully Automated Content-Based Video Search Engine Supporting Spatiotemporal Queries", IEEE Transactions on Circuits and System for Video Technology, vol. 8, No. 5, Sep. 1998; pp. 602-615.

(Continued)

*Primary Examiner* — Daquan Zhao
(74) *Attorney, Agent, or Firm* — Cantor Colburn LLP; Richard Wilhelm

(57) ABSTRACT

The present disclosure relates to a method for recording user activity on a computer. The method includes creating a video file for a video sequence of a user interface of an application of the computer. Video frames may be recorded in the video file, wherein a video frame comprises data indicative of the visual representation of the user interface and corresponding timestamp, wherein the data of the video frame is parsable.

16 Claims, 3 Drawing Sheets

(51) Int. Cl.
  *H04N 5/92*    (2006.01)
  *G06F 17/22*   (2006.01)

(56) References Cited

U.S. PATENT DOCUMENTS

| | | | |
|---|---|---|---|
| 2004/0156549 A1* | 8/2004 | Persiantsev | H04N 19/63 |
| | | | 382/236 |
| 2004/0158820 A1* | 8/2004 | Moore | G06F 9/45 |
| | | | 717/136 |
| 2005/0120132 A1* | 6/2005 | Hutter | H04L 65/1006 |
| | | | 709/234 |
| 2005/0208929 A1* | 9/2005 | Zmrzli | G06F 17/30899 |
| | | | 455/414.2 |
| 2007/0083815 A1* | 4/2007 | Delorme | G11B 27/105 |
| | | | 715/723 |
| 2012/0047448 A1* | 2/2012 | Amidon | H04W 4/029 |
| | | | 715/753 |
| 2012/0084133 A1* | 4/2012 | Ross | G06F 11/3438 |
| | | | 705/14.27 |
| 2016/0014482 A1* | 1/2016 | Chen | G11B 27/031 |
| | | | 386/241 |
| 2016/0267179 A1 | 9/2016 | Mei et al. | |
| 2017/0034847 A1* | 2/2017 | He | H04W 74/06 |

OTHER PUBLICATIONS

Halvey, Martin et al. "Analysis of Online Video Search and Sharing" HT'07, Sep. 10-12, 2007, Copyright 2007 ACM, pp. 217-226.

\* cited by examiner

RECORDING USER ACTIVITY ON A COMPUTER

BACKGROUND

The present invention relates to the field of digital computer systems, and more specifically, to a method for recording user activity on a computer.

User interfaces are part of the machine that handles the human-machine interaction. In complex systems, the user interfaces are typically computerized. The user interfaces are designed so that they are self-explanatory and efficient to describe and present content data. However, there is a need to improve the interactions between humans and machines via the user interfaces.

SUMMARY

Various embodiments provide a method for recording user activity on a computer, computer system and computer program product as described by the subject matter of the independent claims. Advantageous embodiments are described in the dependent claims. Embodiments of the present invention can be freely combined with each other if they are not mutually exclusive.

In one aspect, the invention relates to method for recording user activity on a computer. The method includes creating a video file for a video sequence of a user interface of an application of the computer and recording video frames in the video file, wherein a video frame comprises data indicative of the visual representation of the user interface and corresponding timestamp, wherein the data of the video frame can be parsed.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for recording user activity on a computer. The computer system is configured for creating a video file for a video sequence of a user interface of an application of the computer and recording video frames in the video file, wherein a video frame comprises data indicative of the visual representation of the user interface and corresponding timestamp, wherein the data of the video frame is parsable.

BRIEF DESCRIPTION OF THE DRAWINGS

In the following embodiments of the invention are explained in greater detail, by way of example only, making reference to the drawings in which.

DETAILED DESCRIPTION

Figure 1:
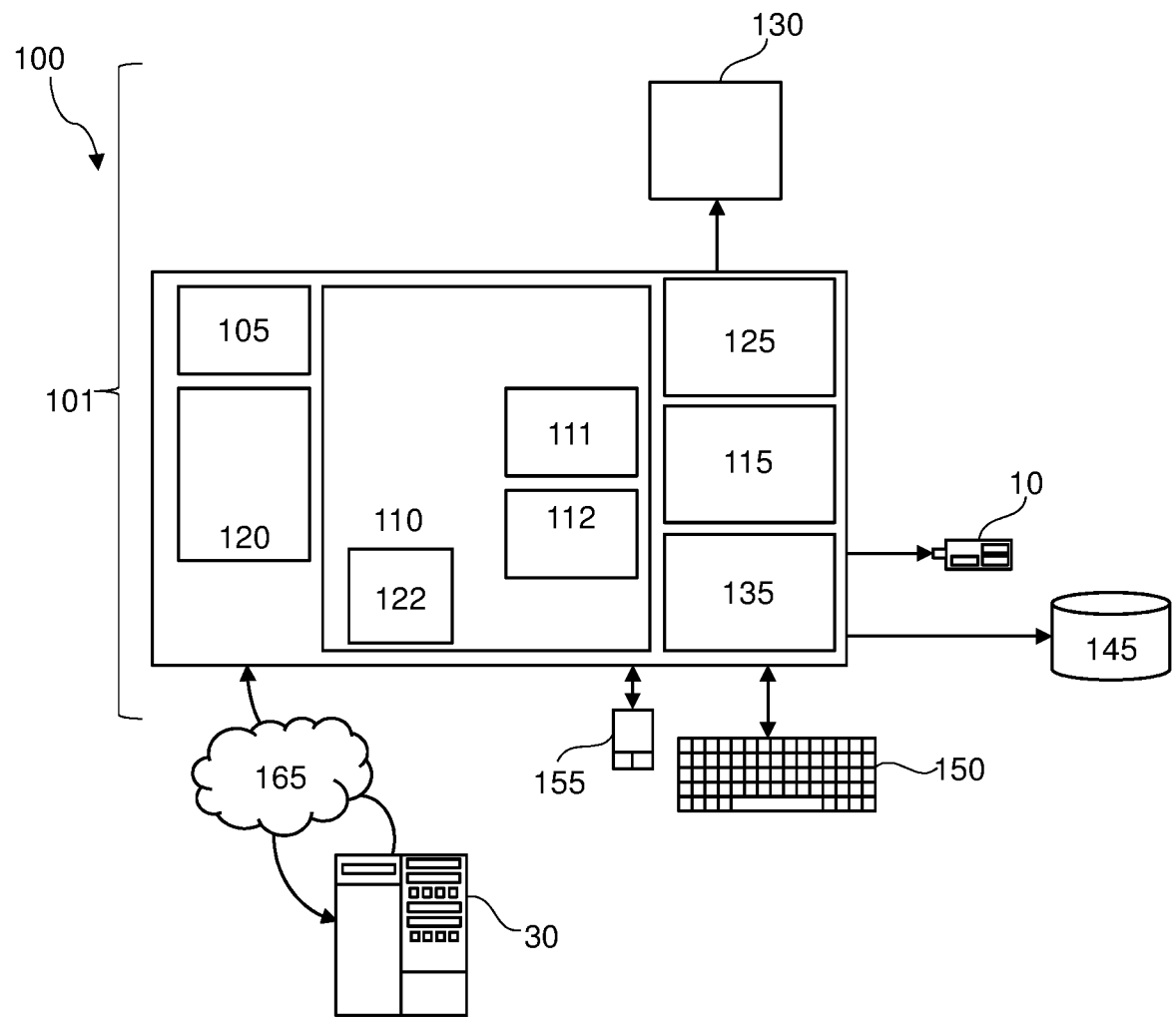
FIG. 1 represents a computerized system, suited for implementing one or more method steps as involved in exemplary embodiments.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The visual representation of the user interface refers to an appearance of the user interface and its content as displayed on a display of the computer at a given point of time. The visual representation may comprise an image, picture, logo, and/or text.

The term network traffic refers to computer network communications that are carried over wired or wireless networks between hosts.

The present method may enable an efficient monitoring of user activities on a computer. The monitoring may be efficient in that the generated videos contain data that can be parsed and thus can be searched for text content of the videos. The present method may for example be used to create videos for tutorials or demos for web application.

According to one embodiment, the method further comprises capturing at least part of network traffic of the application that is received at the computer, and generating the data from the captured traffic that corresponds to the visual representation. This may be advantageous in that the monitoring may not be part of the application and thus may be used for or shared between multiple applications. This is by contrast to the monitoring that is implemented e.g. as a component of the application.

According to one embodiment, the method further comprises: generating a Document Object Model, DOM, structure or tree of the captured http traffic, wherein the data comprises the DOM structure. The usage of the DOM structures may enable a systematic search of the videos based of the known structures of the DOM trees. This may further speed up the search on the created video file. For example, the DOM structure or tree may be in JSON format.

In one example, the video file may be signed (e.g. by the application or by a web browser) in order to ensure consistency and authenticity of the content of the video file. The video file may thus be used to prove that certain actions were taken (bank transaction, certification courses, etc.). For example, a digital signature may be inserted into the video file on a frame-by-frame basis.

According to one embodiment, the method further comprises: generating a Document Object Model, DOM, structure of the source code of the user interface, wherein the data comprises the DOM structure. This embodiment may enable the generation of the data from within the application using tools such as DOM tools as part of the application. This may provide a self-contained application that provides the data and the monitoring functionality in accordance with the present method.

According to one embodiment, the method further comprises: parsing the source code of the user interface, wherein the data comprises the parsed source code corresponding to the visual representation. Using the source code as it for the data of visual representation may save processing resources that would otherwise be required for re-formatting or restructuring of the source code into another format.

According to one embodiment, the method further comprises receiving a text search request, searching the data of the video frames for identifying one or more video frames having the requested text, and providing the identified video frames. The result of the search may be an exact timestamp of a frame. And it can be externalized in a player in the way that video played from this frame.

According to one embodiment, a plyer may be used to translate or render frame content (e.g. html or DOM content) into subsequent images of the video sequence. For example, the content of each frame of the video file is parsable or can be parsed to the same extend as an original web page of the user interface whose visual representation is contained in the frame.

According to one embodiment, the recording of a current video frame comprises: in response to determining that the current visual representation is different from the visual representation of a previously stored video frame, modifying the previously stored video frame by replacing of and/or adding elements to the previously stored video frame to reflect the difference between the visual representations, and storing the modified previously stored video frame as the current video frame. This may save storage space and may provide light weight video files.

According to one embodiment, the video file comprises a header comprising an indication of data type of the data of the video frames, a payload comprising the video frames and an index comprising a mapping of time values and an indication of the video frames.

According to one embodiment, the method further comprises receiving a predefined time value and using the index for identifying the video frame corresponding to the time value, and using the identified video frame for providing a video subsequence of the video sequence.

These embodiments may further speed up the search in the video file as the index and the header may provide another dimension (e.g. time) in addition to the text for performing searches.

According to one embodiment, the method further comprises sorting in association with each video frame and audio frame indicative of the visual representation of the user interface. The video file may be maintained in digital media containers like ogg or mkv containers. The video frames may be combined with audio frames and/or subtitles, or other video by putting them into the container. The video format may be capable to be streamed.

According to one embodiment, the audio frame comprises ambient voice of the computer recorded at the timestamp. The ambient voice may comprise a voice description of the content of the user interface e.g. a tutorial.

According to one embodiment, the application is a web application involving a web browser. The present method may provide a video format which contains captured http traffic and user actions with corresponding timestamps. The video data in this format may be composed of series of HTTP responses, series of events (user actions), context data (size of web browser windows, version of web browser, encodings, etc.). Decoding (rendering) part of the codec for the present video format may be implemented in the way a html content is rendered by a web browser The capturing or creation of the video file may be the functionality of a web browser, network traffic analyzer, mobile application which uses html to render its frontend.

The data of the visual representation of a given video frame may for example comprise http response Data which are sent from a http server to a web browser of a web application. The data of the visual representation of the given video may further comprise cookies from the web browser. The data of the visual representation of the given video may further indicate user events which are triggered by the user who interacts with the web application (button clicks/text input etc.). The data of the visual representation of the given video may comprise web browser context information which build, the context of web page rendering (e.g. windows size, browser version, browser configuration, etc.). The data of the visual representation of the given video may further comprise results of underterministic functions results of functions (like JavaScript Math.random( ) or values of the real time clock). These values may be recorded in order to replay exactly the same content in the video file.

According to one embodiment, the method further comprises storing the video as a history content of a web browser of the web application. This embodiment may further increase the capability of a web browser by providing history of continuous scenes.

According to one embodiment, the method further comprises decoding the video file by rendering the data of each of the video frames in accordance with a predefined frame rate. The data may for example comprise html code. The rendering of the data may for example comprise executing or interpreting the html code using a method such as the method of a web browser for interpreting a html code.

FIG. 1 represents a general computerized system, suited for implementing method steps as involved in the disclosure.

It will be appreciated that the methods described herein are at least partly non-interactive and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

Figure 2:
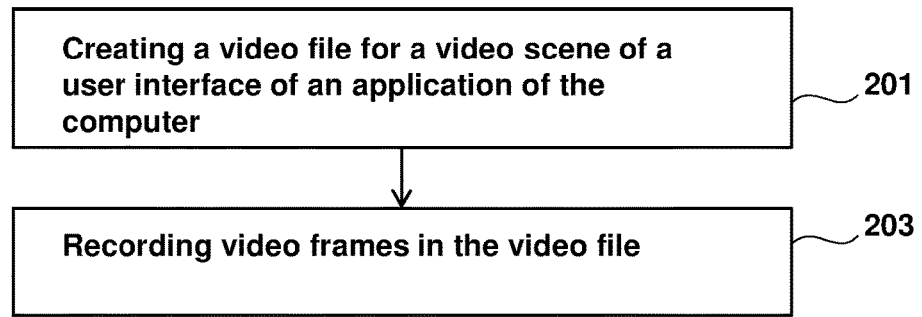
FIG. 2 is a flowchart of a method for recording user activity on a computer.

FIG. 2 is a flowchart of a method for recording user activity on a computer e.g. 100.

In step 201, a video file may be created for a video sequence of a user interface of an application of the computer 100. The user interface may be a graphical user interface (GUI).

The application may be configured to display content on the user interface automatically and/or upon receiving a request or input from the user via the user interface. The user has direct contact with the user interface and with which the user interacts to conduct user activities. The user activities may be monitored by recording one or more video files for a video sequence.

The application may for example be a web application. The web application may be stored on a remote server and delivered to the user over the Internet using web tools such as the HyperText Transfer Protocol (HTTP), the HyperText Markup Language (HTML), and web browser. The web application may be delivered through a browser interface of the web browse on the computer 100. The user interface may be the browser interface. The web application may be configured to accept HTTP requests from the web browser of the computer 100 and return responses to those requests e.g. in the form of an HTML document.

In step 203, video frames may be recorded in the video file. A video frame comprises data indicative of the visual representation of the user interface and corresponding timestamp, wherein the data of the video frame can be parsed.

The video file may for example be stored on a local filesystem of the computer uploaded to remote location, streamed, etc. the streaming of the video file may for example be performed back to the server using Ajax, WebSockets etc. In another example, the video file may be used as a browser history.

For example, the application may be launched or started at time t0, the user interface may be displayed on the display of the computer. The user interface may comprise at time t0 content cont0. At time t1 the user interface may comprise content cont1 . . . at time tN the user interface may comprise content contN. The contents cont0-contN may be same or different. The video sequence may for example cover the time interval [t0, tN]. Each video frame may be associated with a timestamp t0-tN and may comprise data of the visual representation at the timestamp. A video frame associated with timestamp t0 may comprise the data of the visual representation of the user interface including the content cont0 e.g. the data of the visual representation may indicate the way the user interface and content cont0 are displayed.

Following the web application example, the browser interface may display a HTML page. During a session, e.g. [t0, tN], the web browser may visit a number of URI links for the HTML page automatically or in response to user actions. The HTML page may comprise different components, such as one or more embedded images, embedded JavaScript (JS), and HTML elements. The web browser may make multiple HTTP requests to receive and load all these components, which may each have a corresponding URI.

In one example, the data of the visual representation may be obtained by capturing network traffic between the computer and the server. Following the web application example, the HTTP traffic destined to the web browser may be captured (e.g. without being displayed on the user interface). This may particularly be advantageous in case the HTML page is a static page (e.g. without JavaScript). In this case the HTML data serves as data of the visual representation. For example, the data of the visual representation of a given video frame may be generated using a HTTP response at a respective timestamp. If for example the time between two successive HTTP responses is higher than the time between two video frames, the same HTTP response of the first video frame of the two video frames may be used as content of the second video frame of the two video frames. This may for example by copying the content of the first video frame into the second video frame or by putting into the second frame only the changes to the first frame i.e. delta content (as describe herein), wherein such in this case may be null. The reading of the video files frames with delta content may be performed as described herein. For example, the data of the visual representation of a given video frame may be generated from a HTTP response using DOM tools in order to obtain a DOM tree. And, the data of the visual representation of the given video frame may comprise the obtained DOM tree.

In another example, the application may be configured to capture the video file. For example, the web application and/or the web browser may be configured to generate the data of the visual representation. This may for example be performed using a DOM tool. The data of the visual representation comprises a DOM tree.

For example, data of a first or initial visual representation of the user interface may be obtained in onload( ) callback function of the DOM tool. The data of the first visual representation may comprise a first DOM tree that may form content of a respective first frame of the video file. The content of the subsequent frames of the vide file may be obtained using respective subsequence visual representations of the user interface. The subsequence visual representations of the user interface may be obtained using the same method of obtaining the data of the first visual representation. In another example, the subsequence visual representations may be obtained by detecting changes (refereed to also as DOM delta or delta, where DOM delta may be an element or a portion of a DOM tree) to the first visual representation. In this case, the content of a subsequence frame may comprise the changes (delta) to the first DOM tree. The video file may be read by performing a combination of the first frame with the delta of subsequent frames. For example, each modification of the first DOM tree can be captured by DOM mutation functions such as DOMSub-treeModified( ), DOMNodeInserted( ), DOMNodeRemoved(none), DOMNodeRemovedDocument( ), DOMNodeInsertedIntoDocument( ), DOMAttrModified( ), DOMCharacterDataModified( ). This may be advantageous, as if a state of DOM tree is not modified between subsequent http requests there may be no need to interact with browser. For a given frame having delta content e.g. DOM delta, the player that reads or plays the video file may use the DOM tree of the first frame and the DOM delta of the given frame to build a new DOM tree that corresponds to the visual representation of the given frame. For example, if the DOM delta is an element of DOM tree, the corresponding element in the DOM tree of the first frame may be replaced by DOM delta in order to obtain the new DOM tree.

In another example, data of a first or initial visual representation of the user interface may be obtained in onload( ) callback function of the DOM tool. The data of the first visual representation may comprise a first DOM tree that may form content of a respective first frame of the video file (the first frame comprises a full DOM tree). The content of the subsequent frames of the vide file may be obtained using respective subsequence visual representations of the user interface. Part of the subsequence visual representations of the user interface may be obtained using the same method of obtaining the data of the first visual representation and another part of the subsequent visual representations may be obtained by detecting changes with respect to an immediately preceding frame that has the respective full DOM tree. For example, if the video file has 10 frames. The first frame may comprise a full DOM tree in addition to frames number 4, 7 and 10. In this case, the content of the frames 2-3 may be obtained by determining changes with respect to the first frame, the content of the frames 5-6 may be obtained by determining changes with respect to the frame number 4, the content of the frames 8-9 may be obtained by determining changes with respect to the frame number 7. In this option rendering of the video is easier if the user starts the video from the middle.

The video file may be decoded using a method of rendering process in web browsers.

Figure 3A:
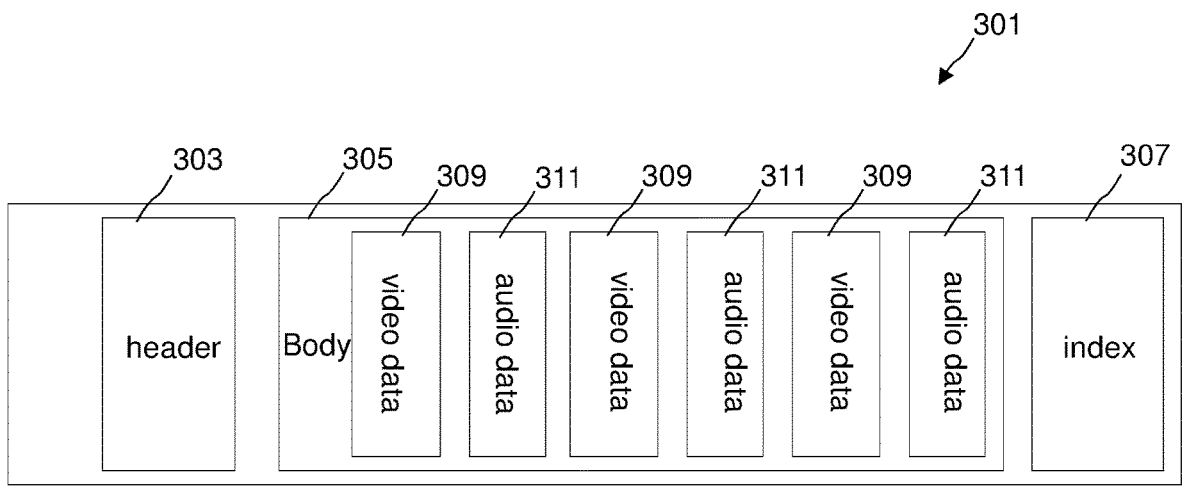
FIGS. 3A, 3B and 3C depict block diagrams illustrating the structure and content of a video file in accordance with the exemplary embodiments.
Figures 3B, 3C:
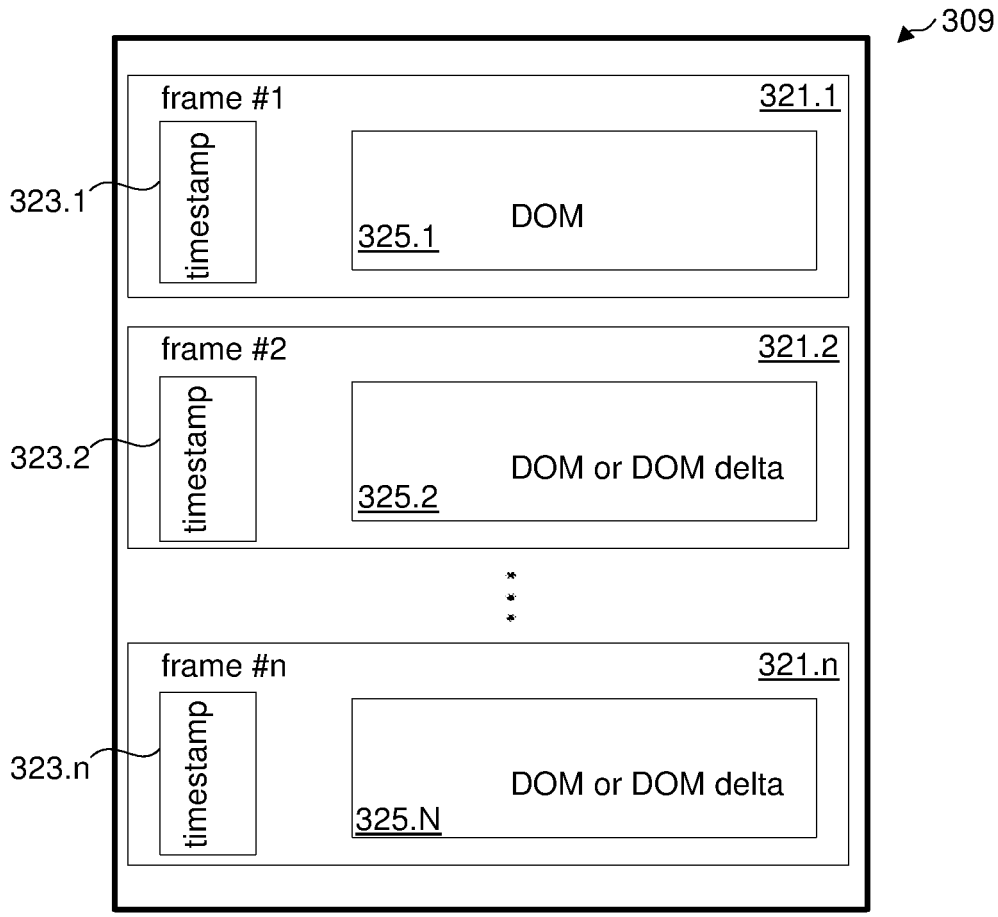

An example of the video file is descried with reference to FIGS. 3A-C.

FIG. 3A depicts a block diagram illustrating the structure of a video file 301 in accordance with the present disclosure. The video file may for example be a video container in avi, ogg or mkv format.

The video file 301 comprises a header 303, a payload or body 305 and an index 307. The header 303 may comprise data indicative of the data type that can be used by a decoder in order to read data stored in the payload 305.

The index 307 may comprise a mapping of time values in association with and an indication or reference of the video frames of the payload 305. The index 307 may enable a search of a given video frame that is the start of a video subsequence. Following the above example, by searching time t3, the corresponding video frame may identified in the index 307. Using the identified frame, a video subsequence covering the time interval [t3, tN] may be obtained. The searched time t3 may be received as input from the user e.g. using a mouse on the user interface or an input field on the user interface.

The payload 305 may comprise video data 309 and audio data 311. FIG. 3B depicts further details of a video data 309. The video data 309 may comprise a group of contiguous video frames 321.1-321.N (collectively referred to as 321) in the sequence in display order. Each video frame 321.1-N comprises a timestamp 323.1-N (collectively referred to as 323) and a DOM tree 325.1-325.N. The DOM trees 325.1-N (collectively referred to as 325) can be parsed. An example of a DOM tree 325.1-325.N is shown in FIG. 3C. The DOM tree 325 of FIG. 3C comprises elements of a html page organized in accordance with the DOM tree. The audio data 311 may comprise audio frames. For example, each video frame 321.1-N may be associated with respective one or more audio frames of the audio data 311. The audio frames may for example comprise recorded voice describing the content of the respective video frames e.g. to provide a tutorial presentation.

In another example, a method of recording user activity on a computer is provided. The method comprises the steps: 1. a software application recording a video, containing the visual representation of the user's GUI as visible on his computer display, and 2. recording into the video captured http traffic and user actions with corresponding timestamps.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for recording user activity on a computer, the method comprising:
    creating a video file for a video sequence of an application delivered through a browser interface of web browser on the computer;
    recording, via functionality of the web browser, video frames in the video file, wherein a video frame comprises data indicative of a visual representation of the browser interface and content of the browser interface as displayed on a display of the computer and a corresponding timestamp, and wherein the data of the visual representation of the video frame is generated using a http response;
    capturing at least part of http traffic of the application that is destined for the web browser; and
    generating the data from the captured http traffic that corresponds to the visual representation,
    wherein the video file comprises a header comprising an indication of data type of the data of the video frames, a payload comprising the video frames and an index comprising a mapping of time values and an indication of the video frames.

2. The method of claim 1, further comprising: generating a Document Object Model, DOM, structure of captured http traffics, wherein the data comprises the DOM structure.

3. The method of claim 1, further comprising: generating a Document Object Model, DOM, structure of a source code of the browser interface, wherein the data comprises the DOM structure.

4. The method of claim 1, further comprising: parsing a source code of the browser interface, wherein the data comprises the parsed source code corresponding to the visual representation.

5. The method of claim 1, further comprising receiving a text search request, searching the data of the video frames for identifying the video frames having the requested text, and providing the identified video frames.

6. The method of claim 1, wherein the recording of a current video frame comprises: in response to determining that a current visual representation is different from the visual representation of a previously stored video frame, modifying the previously stored video frame to reflect a difference between the visual representations, and storing the modified previously stored video frame as the current video frame.

7. The method of claim 6, further comprising receiving a predefined time value and using the index for identifying the video frame corresponding to the time value, and using the identified video frame for providing a video subsequence of the video sequence.

8. The method of claim 1, further comprising sorting in association with each video frame and audio frame indicative of the visual representation of the browser interface.

9. The method of claim 8, the audio frame comprising ambient voice of the computer recorded at the timestamp.

10. The method of claim 1, the application being a web application involving a web browser.

11. The method of claim 10, further comprising storing the video as a history content of a web browser of the web application.

12. The method of claim 1, further comprising decoding the video file by rendering the data of each of the video frames in accordance with a predefined frame rate.

13. The method of claim 1, further comprising inserting a digital signature in the video file.

14. The method of claim 1, further comprising storing the video file in a container having one of AVI or MKV formats.

15. The method of claim 1, further comprising using a player for transforming or rendering the content of the frames into subsequent images of the video sequence.

16. A computer program product comprising a computer-readable storage device having computer-readable program code embodied therewith, the computer-readable program code configured to implement the steps of the method according to claim 1.

* * * * *